United States Patent [19]
Haslett

[11] Patent Number: 6,094,979
[45] Date of Patent: Aug. 1, 2000

[54] FLAT TIRE SENSOR

[76] Inventor: Roland A. Haslett, 11155 80th Ave., Delta, British Columbia, V4C 1W6, Canada

[21] Appl. No.: 09/427,928

[22] Filed: Oct. 27, 1999

[51] Int. Cl.[7] .................................................. B60C 23/02
[52] U.S. Cl. ............................................. 73/146.2; 73/146
[58] Field of Search .................................. 73/146, 146.2, 73/146.3, 146.5, 146.8

[56] References Cited

U.S. PATENT DOCUMENTS 5,924,055  7/1999  Hattori ..................................... 702/138
5,936,155  8/1999  Francois et al. ........................... 73/129

*Primary Examiner*—William Oen
*Assistant Examiner*—Abdullahi Aw-Musse
*Attorney, Agent, or Firm*—Hall, Priddy, Myers & Vande Sande

[57] ABSTRACT

An apparatus and method of detecting the presence of a flat tire on a vehicle. A pair of spaced apart pressure sensing assemblies positioned on a roadway are operative to produce a signal corresponding to the pressure applied to one or more pressure sensing elements in each of the pressure sensing assemblies. Comparison of the pressure applied to each of the pressure sensing elements with a value corresponding to a normal non-flat tire indicates the condition of the tires.

10 Claims, 3 Drawing Sheets

FLAT TIRE SENSOR

FIELD

The present invention relates to a flat tire sensor which detects the presence of a flat tire among the tires of a tractor-trailer or other type of truck or vehicle. Such trucks and trailers typically have multiple axles, with two tires mounted on each side of each axle. When one tire goes flat its appearance does not change significantly because it is being supported at the same position with respect to the road by the adjacent non-flat tire. The present invention provides a method and apparatus for detecting the condition of such flat tires. It also provides a technique for detecting a tire of another vehicle which is low or flat.

BACKGROUND

Truck drivers typically kick or hit their tires with a stick or the like to determine whether any of them are flat. With tractor-trailer rigs having as many as five axles to which there are journaled twenty tires, checking this many tires at each stop represents a significant inconvenience, particularly in the presence of snow, ice and freezing temperatures. When one tire is flat obviously the remaining tire must carry twice its normal load. When the entire truck can weigh up to 100,000 pounds each pair of tires can be loaded with approximately 5,000 pounds. Thus, there is a much increased risk of the remaining adjacent non-flat tire developing a flat and causing a dangerous situation for the truck and driver. Consequently, there is needed a simple, convenient method for testing the condition of the tires of such trucks.

An object of the invention is to provide an apparatus and method for automatically detecting the condition of vehicle tires.

SUMMARY OF THE INVENTION

According to the invention there is provided an apparatus and method of detecting the presence of a flat tire on a vehicle. A pair of spaced apart pressure sensing assemblies positioned on a roadway are operative to produce a signal corresponding to the pressure applied to one or more pressure sensing elements in each of the pressure sensing assemblies. Comparison of the pressure applied to each of the pressure sensing elements with a value corresponding to a normal non-flat tire indicates the condition of the tires.

The sensing assemblies may include a plurality of spaced apart pressure sensors in which case a significant difference in the sensor readings for each of two adjacent tires indicates the presence of a flat tire and side of the truck where the flat tire is located.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1:
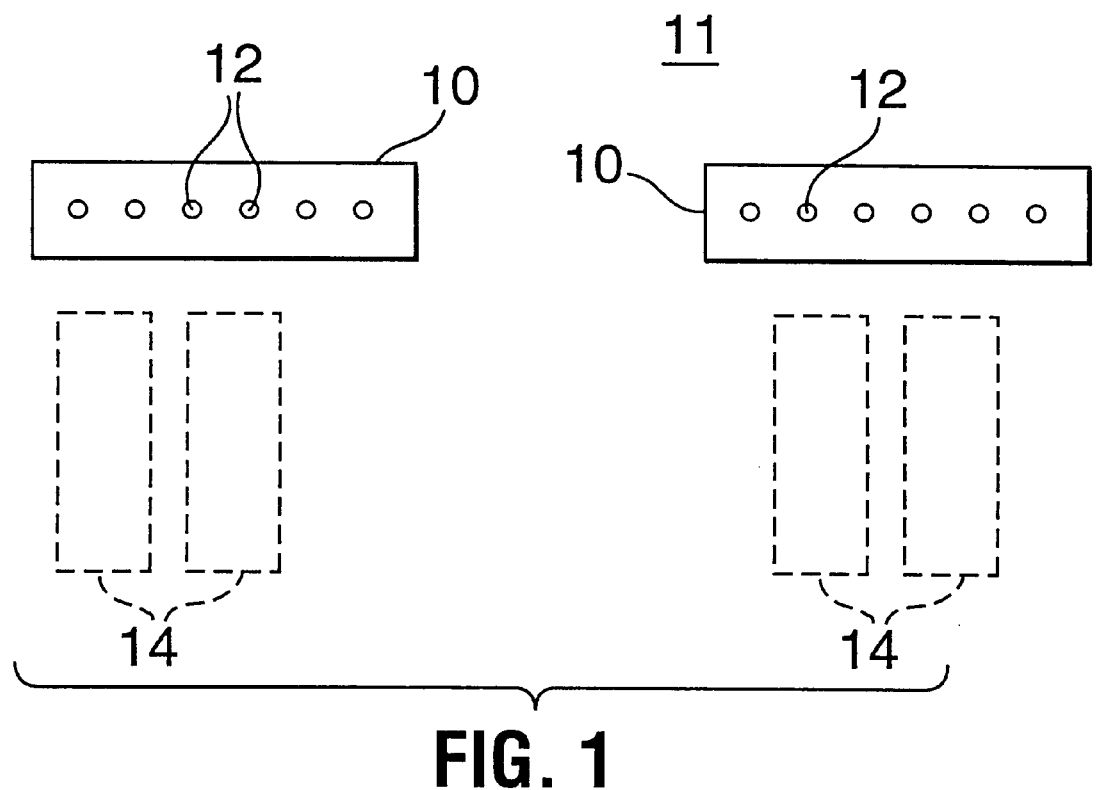
FIG. 1 is a top view of the pair of sensing assemblies.

Referring to FIG. 1, two spaced apart sensing assemblies 10 are positioned in a roadway 11 spaced apart a distance approximately equal to the typical spacing between pairs of wheels of the tractor-trailer or truck having pairs of wheels mounted to each axle. Each sensor assembly 10 has six pressure transducers 12 spaced apart a distance such that at least two are contacted by each truck tire 14 independent of the precise lateral positioning of the tires 14.

Figure 2:
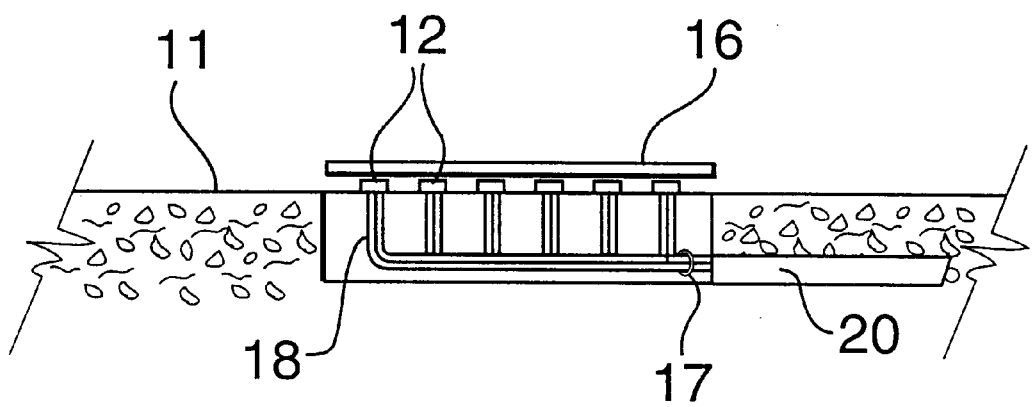
FIG. 2 is a front elevation view of the sensing assemblies installed in a roadway.
Figure 3:
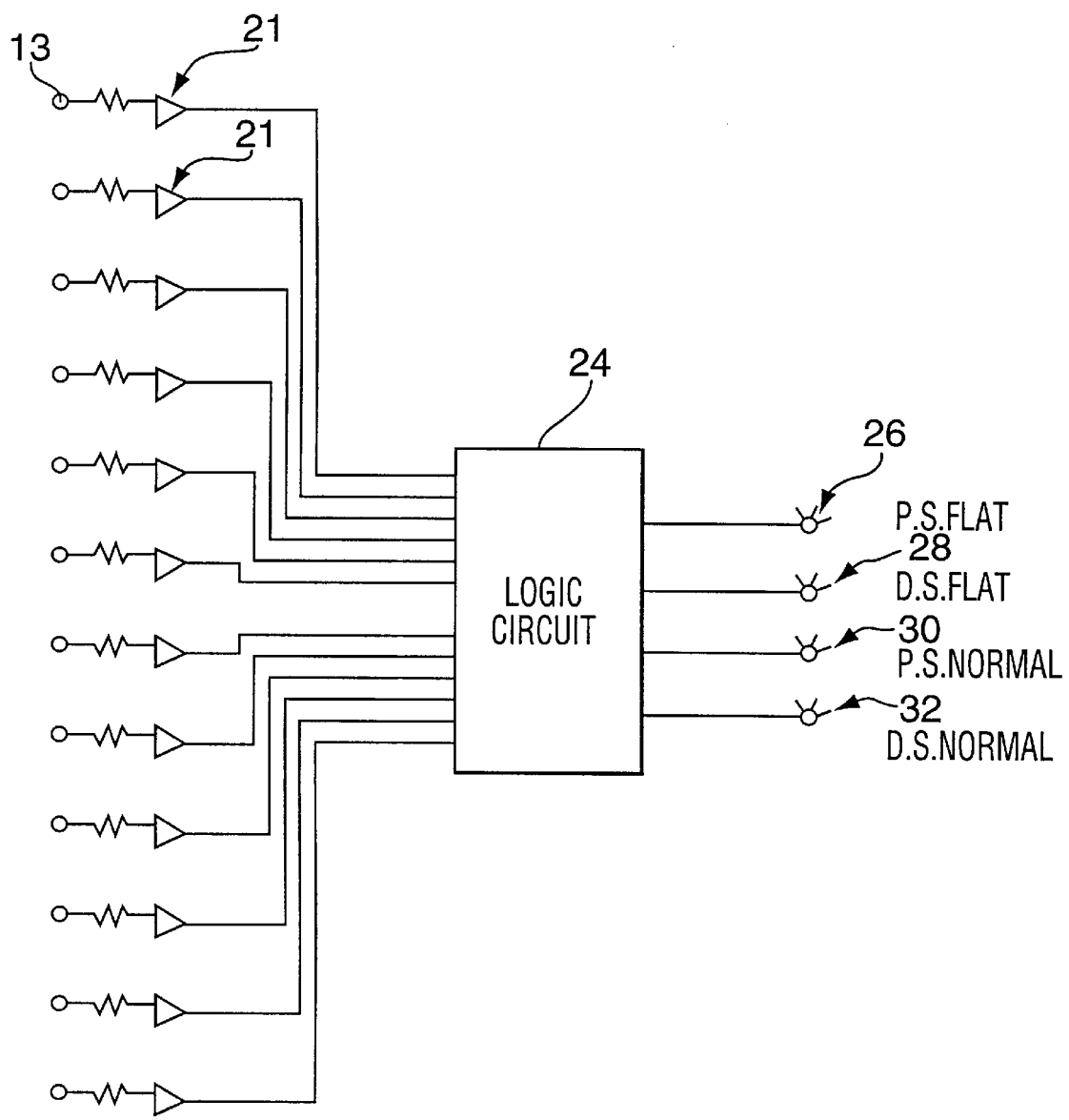
FIG. 3 is a schematic diagram of the electronic circuit for the sensing assemblies.

Referring to FIG. 2 an elastomeric pad 16 is placed over each set of six pressure transducers 12 to prevent the sensors from being lodged in the tire treads and to keep salt, mud, sand, water and ice from contacting the sensors. The resiliency of the elastomeric pad 16 is such that no substantial lateral transfer of pressure occurs such as would be the case for a rigid pad. The wires 18 coupled to each pressure transducer are run to a cable harness 17 and pass through a conduit 20 in the roadway 11 to a control panel usually located within a building nearby. The outputs from each transducer go to standard transducer processing circuits 13 (see FIG. 3) which include bridge circuits (not shown) to measure the value of the signal.

The outputs from such circuits 13 go to a Schmitt trigger circuit 21 which produces a digital output that is directed to a logic circuit 24. The logic circuit 24 does a series of comparisons between the various signals and, depending upon the results, produces a signal through an LED 26 that indicates a passenger side flat tire for the particular set of tires positioned over the sensor assemblies 10. Similarly, LED 28 when illuminated indicates a driver's side flat tire. LED 30, when illuminated, indicates that the tires on the passenger side are not flat while LED 32, when illuminated, indicates that the tires on the driver's side are not flat.

While pressure transducers 12 have been used in the preferred embodiment obviously any other suitable pressure sensor may be substituted such as hydraulic sensors, capacitive sensors or the like. The number of sensors may also be varied depending upon individual requirements. One may also output the sensor readings to obtain an analog value corresponding to the pressure on each sensor assembly. The design of the logic circuitry can be done in various ways ranging from individual logic components such as comparators and switches to a programmed microprocessor. The latter design is the least complicated from the point of view of hardware. The decision tree for the microprocessor is seen in FIG. 4.

Figure 4:
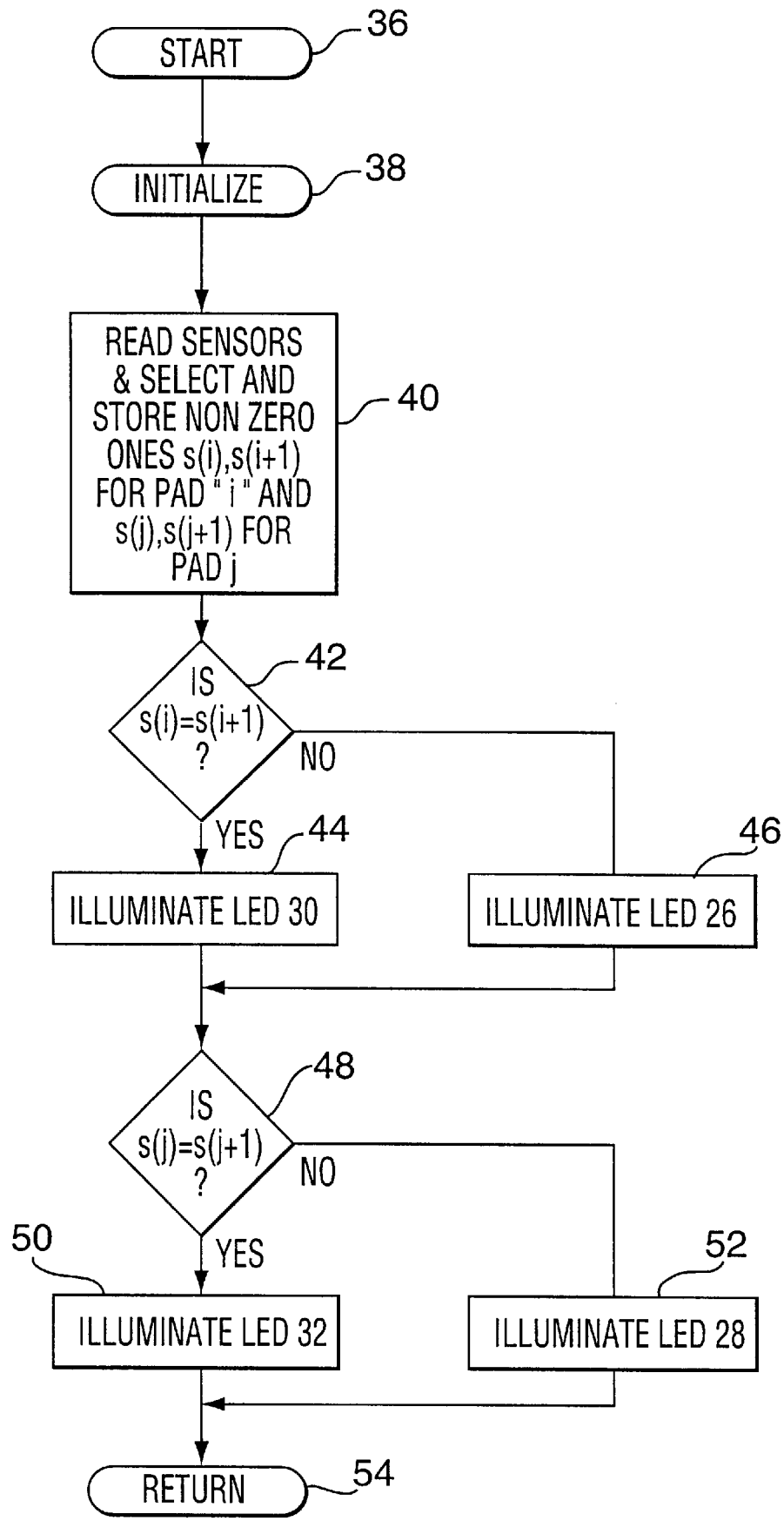
FIG. 4 is a decision tree for a microprocessor logic circuit.

Referring to FIG. 4 from the start 36 the system initializes itself at step 38 and then reads the sensors and selects those sensors that have a reading over a predetermined threshold. With a set of truck wheels positioned on the sensing assemblies 10, for the spacing of the pressure transducers 12 chosen, there will be two sensors in each of the two spaced apart sensing assemblies 10 which have significant readings. Referring to one sensing assembly 10 as "i" and the other as "j", at step 42, s(i) is compared with s(i+1). If s(i) is equal to s(i+1) then at step 44 LED 30 is illuminated. If they are not equal then at step 46 LED 26 is illuminated. Next, at step 48 s(j) is compared with s(j+1). If they are equal then at step 50 LED 32 is illuminated. If not, at step 52 LED 28 is illuminated. In either case, the system at step 54 returns to start and waits until another reading is to be initiated.

Alternatively, if a vehicle has only one tire on each side or if a comparison with an adjacent tire reading is not desired then a value of a reading for a non-flat tire can be input into the system as the value with which the tire readings are to be compared.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A flat tire sensing system, comprising:

(a) a pair of pressure sensing assemblies positioned on a roadway at spaced apart positions so as to intercept both wheels of a vehicle when driven over said pressure sensing assemblies;

(b) a plurality of pressure sensing elements in each of said pair of pressure sensing assemblies, each of said pressure sensing elements operative to measure pressure applied thereto and spaced apart a distance such that at least one of said pressure sensing elements is positioned under each wheel of all wheels on an axle of said vehicle that is over said pressure sensing assemblies;

(c) means for reading each of said pressure sensing elements and storing readings having a magnitude greater than a predetermined threshold, readings below said threshold corresponding to readings for a low pressure and flat tire;

(d) means for comparing each said readings with a value corresponding to a non-flat tire and for displaying whether the reading is equal to or less than the value.

2. A flat tire sensing system, comprising:

(a) a pair of pressure sensing assemblies positioned on a roadway at spaced apart positions so as to intercept both wheels of a vehicle when driven over said pressure sensing assemblies;

(b) a plurality of pressure sensing elements in each of said pair of pressure sensing assemblies, each of said pressure sensing elements operative to measure pressure applied thereto and spaced apart a distance such that at least one of said pressure sensing elements is positioned under each wheel of all wheels on an axle of said vehicle that is over said pressure sensing assemblies;

(c) a reader operative to read each of said pressure sensing elements and storing readings having a magnitude greater than a predetermined threshold, said threshold corresponding to readings for a low pressure and a flat tire;

(d) a comparator operative to compare each said reading with a value corresponding to a non-flat tire and for displaying whether the reading is equal to or less than the value.

3. A flat tire sensing system according to claim 2, including an elastomeric pad over each of said sensing elements.

4. A flat tire sensing system according to claim 2, wherein said pressure sensing elements are pressure transducers.

5. A flat tire sensing system according to claim 2, wherein said means for measuring includes a level detector circuit which outputs a "1" if the signal from said pressure sensing element is above the predetermined threshold and outputs a "0" otherwise.

6. A flat tire sensing system according to claim 2, wherein said means for comparing compares the readings of adjacent ones of said pressure sensing elements with readings above said predetermined threshold and if equal indicates non-flat tires and if not equal indicates a flat tire.

7. A flat tire sensing system according to claim 3, wherein said elastomeric pad transmits all pressure substantially vertically downwardly.

8. A flat tire sensing system according to claim 2, wherein the value corresponding to the non-flat tire is determined for wheels comprising a pair of wheels on each side of said vehicle by comparing non-flat readings for said sensing elements for each of said sensing assemblies and, if not equal, displaying an indication of a flat tire or of a tire having lower than normal pressure.

9. A method of sensing flat tires or tires having a low pressurization, comprising:

(a) measuring a pressure value imposed on a pressure sensing element under each of a plurality of tires aligned along a common axis perpendicular to a length of said vehicle;

(b) comparing each pressure value with a predetermined value corresponding to a non-flat tire and displaying whether a corresponding tire of said vehicle has a low or normal pressurization.

10. A method according to claim 9, including, for vehicles having two or more wheels on each side thereof, said comparing step includes selecting for said predetermined value a value of a reading for a tire on each side of said vehicle having a greater reading than an adjacent tire.

* * * * *